No. 662,403. Patented Nov. 27, 1900.
E. R. EDSON.
RENDERING APPARATUS.
(Application filed Nov. 9, 1899.)
(No Model.) 2 Sheets—Sheet 1.
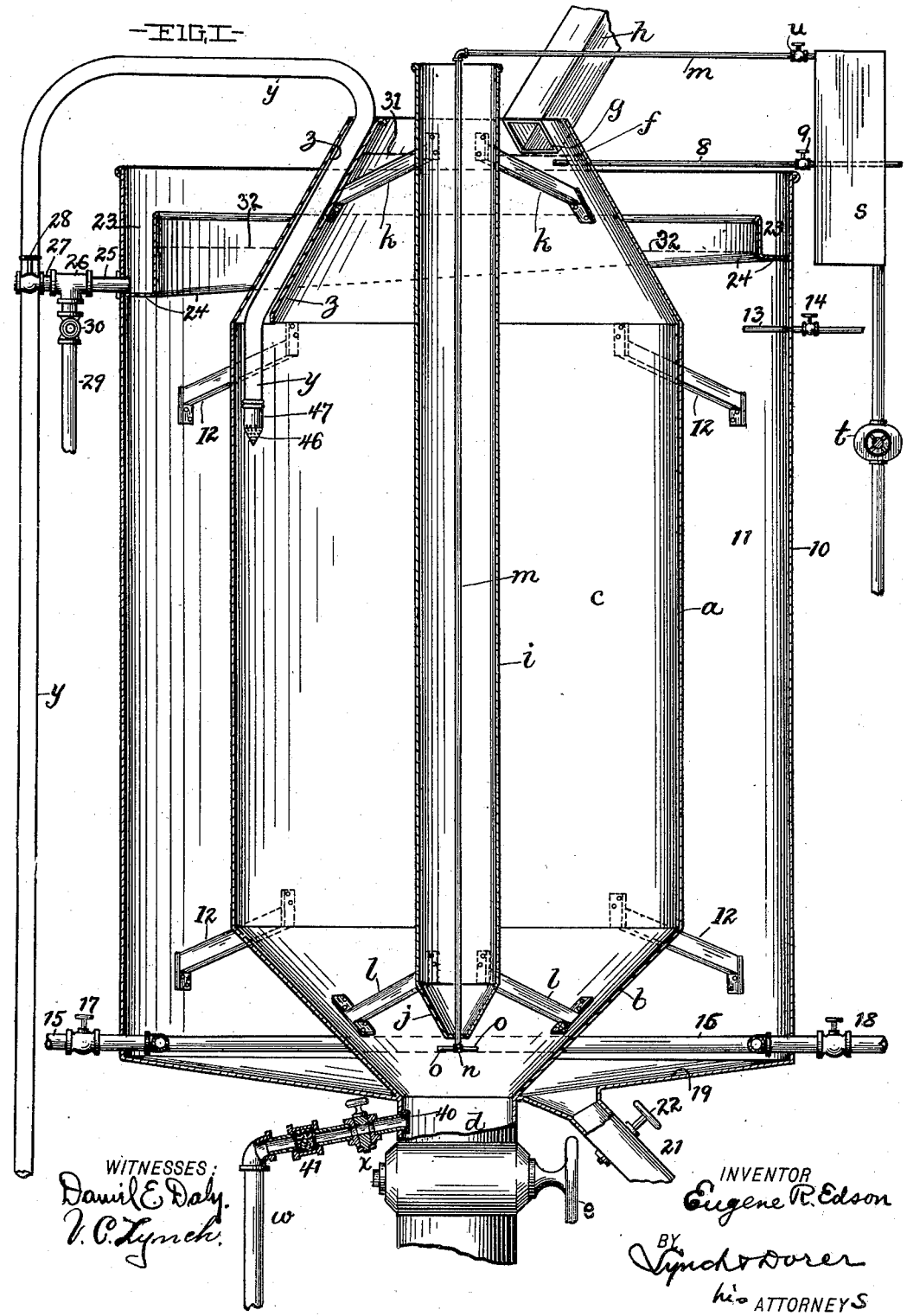

No. 662,403. Patented Nov. 27, 1900.
E. R. EDSON.
RENDERING APPARATUS.
(Application filed Nov. 9, 1899.)
(No Model.) 2 Sheets—Sheet 2.
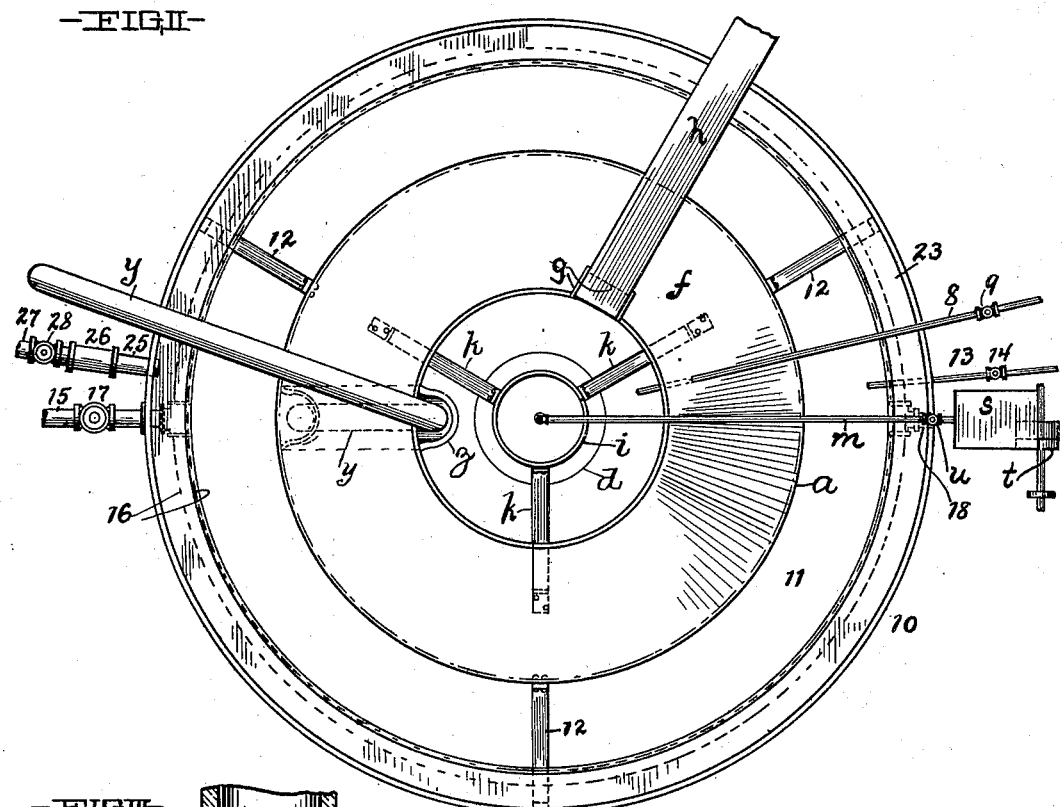
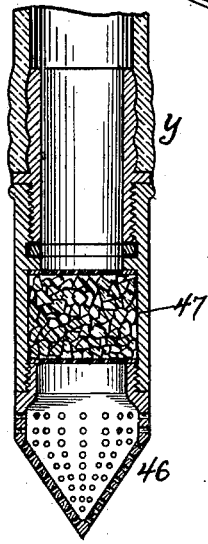
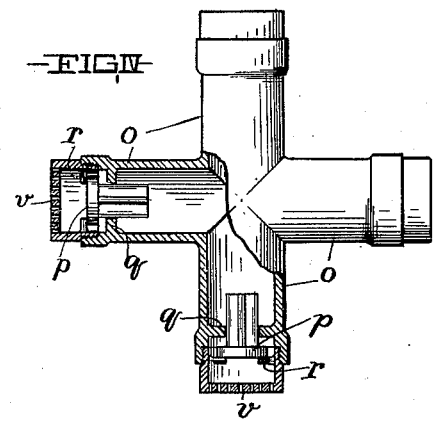
WITNESSES:
Daniel E. Daly
V. C. Lynch
INVENTOR
Eugene R. Edson
BY Lynch & Dorer
his ATTORNEYS

UNITED STATES PATENT OFFICE.

EUGENE R. EDSON, OF CLEVELAND, OHIO, ASSIGNOR TO THE BUCKEYE FISH COMPANY, OF SAME PLACE.

RENDERING APPARATUS.

SPECIFICATION forming part of Letters Patent No. 662,403, dated November 27, 1900.

Application filed November 9, 1899. Serial No. 736,401. (No model.)

*To all whom it may concern:*

Be it known that I, EUGENE R. EDSON, a resident of Cleveland, county of Cuyahoga, and State of Ohio, have invented certain new and useful Improvements in Apparatus for Extracting Gelatin-Forming Substances and Oil from Fish and other Material; and I do hereby declare the following to be a full, clear, and exact description of the invention, such as will enable others skilled in the art to which it pertains to make and use the same.

This invention relates to improvements in apparatus for treating fish or parts of fish and other materials to produce oil and gelatin.

The primary object of this invention is to produce an apparatus whereby fish or parts of fish can be economically treated, whereby the oil extracted from the material undergoing treatment is not, in connection with other matter of the mass of material, converted into an emulsion or otherwise injured, and whereby the congealableness of the gelatin solution formed by treating the material with a suitable solvent is not destroyed.

With this object in view and to the end of realizing other advantages—such, for instance, as the purification of the fish-oil—the invention consists in certain features of construction and combinations of parts herein-after described, and pointed out in the claims.

In the accompanying drawings, Figure I is a side elevation, mostly in central vertical section, of apparatus embodying the invention that constitutes the subject-matter of this application. Fig. II is a top plan of the same. Fig. III is an enlarged side elevation of the strainer and filter with which the receiving end of the siphon-forming hose or tube employed in draining the gelatin solution from the material undergoing treatment is employed. Fig. IV is a bottom plan, partly in section, of the head formed upon the lower end of the pipe employed in conducting air into the lower portion of the mass of material undergoing treatment.

Referring to the drawings, $a$ designates an upright tank or receptacle into which the fish or parts of fish or other material that are to be treated are introduced. The tank or receptacle $a$ has its lower portion $b$ gradually reduced diametrically in a downward direction to facilitate the escape of the guano-forming residue that is left in the said receptacle after the oils and glues or gelatin have been extracted from the material within the receptacle at the discharge-pipe or outlet $d$ with which the chamber $c$ of the receptacle $a$ at the lower end of the inverted-cone-shaped lower portion of the receptacle communicates. The outlet $d$ constitutes, therefore, the receptacle's outlet for the guano-forming residue and is provided with a valve $e$ of any improved construction for interrupting and establishing communication from the chamber $c$ through the pipe or outlet $d$.

The upper portion of the tank or receptacle $a$ is gradually reduced diametrically toward the receptacle's upper extremity. The receptacle $a$ is open at the upper end of its upper conical portion $f$, that is provided with the lateral aperture $g$, with which the feed-spout $h$ communicates. The feed-spout $h$ is in open relation, therefore, with the chamber $c$ of the receptacle $a$, preferably at the upper end of the upper conical portion $f$ of the receptacle.

The tank or receptacle $a$ is provided centrally with a vertically-arranged or upright core $i$, that extends, preferably, from a short distance above the upper conical portion of the said receptacle into the lower inverted-cone-shaped portion $b$ of the receptacle. The core $i$ is closed at its lower end and has its lower end portion gradually reduced diametrically in a downward direction or inverted-cone shaped, as at $j$, so as to avoid obstructing the passage of the guano-forming residue to the outlet $d$ of the receptacle. The core $i$ is supported from the shell of the receptacle $a$ in any approved manner, and preferably the core is supported from the upper conical portion and the lower inverted-cone-shaped portion of the receptacle. In the apparatus illustrated braces $k$ have, respectively, one end thereof secured to the core and the other end attached to the shell of the conical portion $f$ of the receptacle $a$. Similarly braces $l$ have, respectively, one end thereof secured to the lower portion of the core $i$ and the other end attached to the lower inverted-cone-shaped portion $b$ of the receptacle $a$. The core $i$ is hollow, and a pipe or pipe-line $m$ for conducting air under pressure into the lower portion of the chamber $c$ of the receptacle $a$ extends vertically and centrally through the said core and is provided at its lower end below and, preferably, near the lower extremity of the core with a head $n$, that has a plurality of, and preferably several, laterally-projecting arms $o$. Each of the arms $o$ is provided internally with a check-valve $p$, as shown in Fig. IV, and with a seat $q$ for the inner end of the valve and with a stop-forming flange or lug $r$ for limiting the outward movement of the valve. Each valve $p$ is free to move, therefore, in the direction required to establish open relation between the pipe $m$ and the chamber $c$ of the receptacle $a$ by any pressure within the said pipe $m$, but is closed and retained closed by the pressure within the chamber $c$ when there is no pressure in the pipe $m$ or when the pressure in the pipe $m$ becomes less than the back pressure within the chamber $c$. Each arm $o$ is provided at its outer end with a screen $v$ for preventing ingress of solid material from the chamber $c$ into the said arm. The pipe $m$ extends outside of the receptacle $a$ a suitable distance and is in open relation at its outer end with the chamber of a tank $s$, wherein air under pressure is stored and supplied by a suitably-operated pump $t$, that has its outlet connected with the tank $s$ in any approved manner and has its inlet communicating with the external atmosphere. The pipe $m$ at any suitable point between the tank $s$ and the core $i$ is provided with a valve $u$ for regulating the supply of air under pressure to the chamber $c$.

The outlet $d$ of the receptacle $a$ is provided with a valved drain-pipe $w$ for draining from the said receptacle any glue solution accumulating in the outlet and in the lower portion of the receptacle $c$ above the valve $e$ of the outlet, and the passage-way from the chamber $c$ through the pipe $w$ is controlled by the valve $x$, with which the said pipe is provided. The pipe $w$ at its receiving end is provided with a screen 40 for preventing the ingress of solid matter from the chamber $c$ into the said pipe. The pipe $w$ is provided also, preferably beyond the outer end of the casing containing the valve $x$, with a filter 41, whereby the liquid that is conducted from the chamber $c$ through the said pipe is purified. The receptacle $a$ is provided also with an outlet for the solution that contains the substance required to form isinglass or a higher grade of gelatin extracted from the material treated within the receptacle, and the said outlet comprises, preferably, a siphon consisting of a somewhat stiff flexible hose or tube $y$, that extends through a guide-forming tubular sheath or case $z$, formed internally of and upon the upper conical portion $f$ of the receptacle $a$. The hose or tube $y$ is manipulated in any approved manner, and the sheath or case $z$, that extends, preferably, from the upper end of the upper conical portion $f$ of the receptacle to the lower end of the said portion of the receptacle, is instrumental in guiding the hose or tube into the outer portion of the said chamber. The siphon-forming hose or tube $y$ has its receiving end provided, preferably, with a screen or strainer 46 for preventing the ingress of solid matter from the chamber $c$ into the said tube, and the latter at the inner side of the screen 46 is provided with a filter 47. The screen or strainer is preferably conical or tapering to facilitate the passage of the same into and through material being treated within the receptacle $a$.

The provision of the core $i$ centrally of the receptacle $a$ renders the form of the chamber $c$ annular around the said core. The annular form of chamber $c$ is important to prevent solidifying or caking of the mass within the receptacle. If the core were omitted, the material undergoing treatment within the receptacle $a$ would have a tendency to gather and cake into a solid mass within the central portion of the receptacle. The presence of the core $i$ prevents such a caking or gathering of the material.

A valved water-supply pipe 8 is arranged to discharge into the upper end of the receptacle $a$.

The tank or receptacle $a$ is arranged centrally of a vertically-arranged or upright tank 10, that is larger diametrically than the receptacle $a$, so as to form an annular chamber 11, surrounding the said receptacle $a$. The tank 10 extends from the lower extremity of the lower inverted-cone-shaped portion $b$ of the receptacle $a$ upwardly to near the upper end of the upper conical portion $f$ of the receptacle $a$. The tank 10 is supported in any approved manner; but the receptacle $a$ is supported, preferably, from and internally of the tank 10, preferably by braces 12, attached, respectively, at one end to the receptacle $a$ and having the other end secured to the tank 10. A water-supply pipe 13 extends and discharges into the chamber 11 of the tank 10 below a trough 23, formed internally of the upper portion of the said tank. The pipe 13 has a valve 14 for controlling the supply of water to the chamber 11. A steam-supply pipe 15 extends into the lower end of the chamber 11 and there terminates in a coil 16, employed in heating the water supplied to the said chamber. The pipe 15 is provided with a valve 17 for controlling the supply of steam to the coil 16, and the coil 16 is provided, preferably, with a valved drain-pipe 18. The bottom 19 of the chamber 11 declines toward the lower extremity of the inverted-cone-shaped lower portion of the receptacle $a$, and the chamber 11, at the lower portion of the bottom 19, is in open relation with the valved drain-pipe 21.

As already indicated, a trough 23 is formed internally of and upon the upper portion of the tank 10 a suitable distance above the water-supply pipe 13. The trough 23 is arranged only above the outer portion of the water-receiving chamber 11 of the tank 10, and consequently the said chamber extends upwardly between the trough and the upper conical portion of the tank or receptacle $a$. The bottom 24 of the trough declines toward the trough's outlet that is formed by a short pipe 25, that has its inner end communicating with the deepest portion of the trough. Pipe 25 has its outer end connected by an elbow 26 with two valved pipes 27 and 29.

The operation of the apparatus is as follows: The fish or parts of fish or other material that are to be treated within the apparatus are introduced at the spout $h$ into the tank or receptacle $a$ after the operator has closed the valve $e$ of the receptacle's outlet $d$ and the valve $x$ of the drain-pipe $w$. The valve $u$ of the air-supply pipe $m$ is normally closed, and the siphon-forming hose or tube $y$ may be removed from the tank or receptacle $a$ at the commencement of the operation of the apparatus. The valve 9 of the water-supply pipe 8 is normally closed. When the receptacle $a$ has been supplied with a suitable amount of material to be treated, the valve 9 is opened, whereupon water will run from the pipe 8 upon the material within the receptacle $a$, and such relative quantities of water and fish or other material requiring treatment are introduced into the receptacle as will prevent caking of the solid material within the receptacle $a$ in a vertical direction and will cause the said receptacle to be filled too near the latter's upper extremity. Preferably hot water is supplied through the pipe 8. The level of the contents within the receptacle is indicated by the dotted line 31, Fig. 1, within the upper portion of the said receptacle. The water discharged into the receptacle $a$ from the pipe 8 constitutes a solvent suitable for the treatment of the material within the receptacle. Having supplied the receptacle $a$ with the material to be treated and the solvent-constituting water, the outer tank 10 has its annular chamber 11 supplied with water from the pipe 13 upon opening the valve 14 of the said pipe. The water introduced into the chamber 11 by the pipe 13 is preferably heated in any approved manner before it enters the said pipe. The desired level of water maintained within the chamber 11 is indicated by the dotted line 32, Fig. 1, within the upper end of the said chamber. The chamber 11 having been supplied with water from the pipe 13, the valve 17 of the steam-supply pipe 15 is opened, so as to supply steam to the heating-coil 16, and the hot water supplied to the chamber 11 by the pipe 13 is quickly heated to a boiling temperature by the action of the heating-coil 16. The diameter of the receptacle $a$ is preferably about two-thirds of the diameter of the tank 10. In any event the diameter or transverse area of the receptacle $a$ is such relative to the diameter or transverse area of the chamber 11 and the boiling water within the chamber 11 is maintained at such a temperature that the mass of material within the chamber $c$ of the receptacle $a$ shall be heated to and maintained at a high temperature below the boiling-point—such, for instance, as a temperature of 200° or 210° Fahrenheit. A temperature as high or above the boiling-point should be avoided in the treatment of the mass of material within the receptacle $a$, because the treatment of the said material with a temperature as high as or above the boiling-point would result in the conversion of the oil that is to be extracted from the material into an emulsion and would discolor or otherwise injure the oil and destroy the congealableness of the substance to be dissolved in the water to produce gelatin upon the subjection of the solution to a suitably low temperature after its removal from the receptacle $a$. During the treatment of the material within the receptacle $a$ with a solvent at a high temperature below the boiling-point the scum-forming impurities that constitute the lightest portion of the mass rise first and appear and accumulate on top of the mass within the upper end of the receptacle and overflow from the receptacle's upper extremity down the external surface of the upper conical portion $f$ of the said receptacle onto the boiling water in the tank 10. Any matter escaping with the said scum from the receptacle $a$ and heavier than the water within the chamber 11 of the tank 10 descends to the bottom of the said chamber, and that portion of the scum that is lighter than the boiling water is either vaporized or caused to overflow from the top of the boiling water into the trough 23, whence it passes into pipe 25 and thence is conducted off by pipe 27, and, of course, preparatory to the reception of the scum by the trough the valve 28 of the pipe 27 is opened, if not already opened, and the valve 30 of the pipe 29 is closed, if not already closed. The water-level maintained within the chamber 11 of the tank 10 should be such relative to the trough 23 that such portions of the scum as have not been precipitated within the boiling water nor evaporated upon the boiling water shall be at once conducted to or caused to overflow into the trough 23. The oil extracted from the material within the receptacle $a$ is the next lightest portion of the mass of material undergoing treatment, and consequently rises into the upper end of the receptacle and causes any scum that has not yet overflown from the receptacle to overflow therefrom. As soon as the scum is removed from the receptacle $a$ and conducted off by pipe 27 the valve 28 of the said pipe is closed and the valve 30 of the pipe 29 opened. Oil extracted from the material within the receptacle $a$ continues to rise and ultimately overflow from the upper open end of the said receptacle and adown the external surface of the upper conical portion $f$ of the receptacle onto the boiling water within the chamber 11 of the tank 10. The steam rising from the boiling water through the oil floating upon the water vaporizes the impurities in the oil. Any foreign matter passing with the oil to the boiling water and heavier than the oil and water descends to the bottom of the chamber 11. The lighter impurities contained in the oil are vaporized, as already indicated, and purified oil overflows from the boiling water into the trough 23. The desired level of boiling water within the chamber 11 can be readily maintained by such a regulation of the valve 14 of the pipe 13 as will first establish a suitable level and thereupon maintain the said level during the boiling of the water by establishing a continuous flow of water from the pipe 13 into the chamber 11 equal to the quantity of water continually passing off in the form of steam during the operation of the water. The oil is floated on top of the boiling water for about two hours and caused to overflow by causing more water to flow into the chamber 11 from the pipe 13. As soon as the extracted oil that has readily risen has overflowed from the receptacle $a$ without requiring any assistance from an external agency or as soon as the flow of oil from the material undergoing treatment within the receptacle $a$ becomes slow and rises with difficulty on account of the gradual decrease in the quantity of the oil remaining with the material air under pressure is introduced through the pipe $m$ into the lower portion of the chamber of the receptacle $a$ in a lateral direction below the core $i$ upon opening the valve $u$ of the said pipe, and obviously the provision of the said pipe with the head $n$ and the latter's valved arms $o$ causes the air to be discharged laterally in different directions into the lower end of the chamber, and the air discharged from the said head rises into and disintegrates the material and forces the remaining oil or facilitates the flow of oil to the top of the mass within the receptacle $a$.

The substance extracted from fish material and dissolving in the solvent-constituting water is suitable for the production of various grades of gelatin and may properly be denominated a "gelatin solution." Some parts of fish contain a gelatin-producible substance of various grades—such, for instance, as matter suitable for the production of isinglass or substantially pure gelatin and other matter convertible into the lower grades of gelatin—such, for instance, as glues. Fish material of this character may be subjected to two or more treatments within the receptacle $a$ and several runs of gelatin solution from the receptacle taken. Suppose the first run of liquid were suitable for producing a high grade of gelatin—such, for instance, as isinglass. This run would be effected through the hose or tube $y$. If the second run of liquid from the receptacle were suitable for producing a high grade of glue, the same may be drained from the receptacle $a$ through the hose or tube $y$, but kept separate from any purer liquid previously drawn from the receptacle, or drained through the pipe $w$. A third or fourth run of liquid from the receptacle $a$ will generally yield a lower grade of glue-producing product and is effected through the pipe $w$. In other words, the tube $y$ is the receptacle's outlet for the liquid from which high grades of gelatin are obtained, while the pipe $w$ constitutes the receptacle's outlet for the liquid from which lower grades of gelatin are producible. The siphon-forming tube $y$ is introduced first into the upper portion of the mass within the receptacle $a$ and is gradually fed downwardly in the receptacle $a$ as the level of the gelatin solution descends within the mass during a run of solution from the receptacle $a$. The gelatin solution largely forms or appears within the outer portion of the chamber $c$, and hence the tube $y$ by means of the open-ended case $z$ is introduced and guided into the said portion of the chamber. As already indicated, the liquid that is conducted from the receptacle through the tube $y$ is strained by the strainer or screen at the receiving end of the said tube and cleaned by the filter within the said tube, and the liquid that is drained from the receptacle $a$ through the pipe $w$ is strained by the screen or strainer at the receiving end of the said pipe and filtered by the filter within the pipe.

The operation of the apparatus may be continued by so regulating the valve 9 of the water-supply pipe 8 or opening the said valve at suitable intervals of time as to maintain such a level of the mass of material within the receptacle $a$ or to reëstablish the desired level as will accommodate a continuation of the flow of oil from the upper end of the receptacle $a$ until all or substantially all of the oil has been extracted from the fish material and until all or substantially all of the substance useful in the production of gelatin has been separated from the solid material. The residue remaining in the chamber $c$ of the receptacle $a$ after the separation of the desired oil and the gelatin-forming substance from the mass within the said chamber is drawn off through the outlet $d$ upon opening the valve $e$ and forms guano or fertilizer.

Any solid matter that has accumulated upon the bottom 19 of the chamber 11 of the tank 10 is removable from the said chamber through the pipe 21 upon opening the valve 22 of the said pipe.

It will be observed that by the apparatus hereinbefore described no material is wasted, and the various substances or matter, solid and liquid, that compose the fish or parts of fish or other material operated upon are economically separated and saved to the best advantage.

What I claim is—

1. Apparatus of the character indicated, comprising a receptacle for receiving the material to be treated; means for heating the material supplied to the receptacle; means for supplying the receptacle with a solvent; a valved residue-outlet leading from the lower end of the receptacle's chamber; a valved pipe in open relation with the lower end of the said chamber above the valve in the aforesaid outlet, and a filter arranged in the line of the said pipe, substantially as and for the purpose set forth.

2. Apparatus of the character indicated, comprising a receptacle for receiving the material to be treated and the solvent employed in the treatment of the material; means for heating the material placed within the receptacle; a valved residue-outlet leading from the lower end of the said chamber; a valved pipe in open relation with the chamber at a point between the residue-outlet and the said chamber; a strainer at the receiving end of the pipe, and a filter arranged within the pipe outside of the valved portion of the pipe, substantially as and for the purpose set forth.

3. In apparatus of the character indicated, the combination, with the receptacle, wherein the material is to be treated, provided with a core $i$ arranged within and centrally of the said receptacle, of a siphon-forming tube extending into the said receptacle, and means for guiding the said tube into the outer portion of the chamber of the receptacle between the aforesaid core and the surrounding wall of the said chamber, substantially as and for the purpose set forth.

4. In apparatus of the character indicated, the combination, with the receptacle in which the material is to be treated, which receptacle has an upper conical portion $f$ and is provided with a core $i$ arranged within and centrally of the said receptacle, of a siphon-forming tube adapted to extend into the said receptacle, and means, internally of the receptacle, for guiding the said tube into the outer portion of the chamber of the receptacle between the aforesaid core and the surrounding wall of the said chamber, substantially as and for the purpose set forth.

5. In apparatus of the character indicated, the combination, with a receptacle in which the material is to be treated, which receptacle has an upper conical portion, of the siphon-forming tube adapted to extend into the said receptacle, and the guide-forming open-ended sheath or casing $z$ formed internally of and upon the aforesaid conical portion of the receptacle, substantially as and for the purpose set forth.

6. Apparatus of the character indicated, comprising a tank 10, a valved water-supply pipe arranged to discharge into the tank, means for supplying the heat necessary to boil the water within the tank, a receptacle arranged within and centrally of the tank and having its upper end provided with a material-inlet, a valved liquid-supply pipe arranged to discharge into the material-receiving chamber of the said inner receptacle, and means for draining the said chamber of solution that is formed within the chamber, substantially as and for the purpose set forth.

7. Apparatus of the character indicated, comprising a tank 10; a steam-coil 16 within the tank; a valved water-supply pipe 13 arranged to discharge into the tank; a receptacle arranged within and centrally of the tank and having its upper end provided with a material-inlet; a valved water-supply pipe arranged to discharge into the material-receiving chamber of the said inner receptacle; and means for draining the said chamber of solution that is formed within the chamber, substantially as and for the purpose set forth.

8. Apparatus of the character indicated, comprising a tank 10; a valved water-supply pipe 13 arranged to discharge into the tank; a receptacle arranged within and centrally of the tank and having an inverted-cone-shaped lower portion and a centrally-located core $i$; a valved residue-outlet $d$ leading from the lower end of the inverted-cone-shaped lower portion of the said receptacle centrally of the bottom of the tank; a valved steam-coil 16 within the tank around the inner receptacle; a valved drain-pipe $w$ leading from and in open relation with the lower end of the chamber of the aforesaid receptacle, and a valved water-supply pipe arranged to discharge into the upper portion of the said receptacle, substantially as and for the purpose set forth.

9. Apparatus of the character indicated, comprising a tank, a valved water-supply pipe arranged to discharge into the tank, a receptacle arranged within and centrally of the tank and having a centrally-located core, a valved residue-outlet leading from the lower end of the aforesaid inner receptacle centrally of the bottom of the tank, means for supplying the heat necessary to boil a body of water supplied to the aforesaid tank around the inner receptacle, a liquid-supply pipe arranged to discharge into the inner receptacle, an oil-outlet formed at the upper end of the inner receptacle, a valved air-conducting pipe or passage-way arranged to discharge into the chamber of the inner receptacle, and means for supplying air under pressure to the said passage-way, substantially as and for the purpose set forth.

10. Apparatus of the character indicated, comprising a chamber for receiving the material to be treated and the liquid employed in treating the material, which receptacle has an oil-outlet at its upper extremity, a hollow core arranged centrally of the material-receiving chamber of the receptacle and extending from the chamber's upper end into the lower portion of the chamber and closed at its lower end, an air-conducting pipe or passage-way arranged to discharge into the aforesaid chamber below the core, and means for supplying air under pressure to the said passage-way, substantially as and for the purpose set forth.

11. Apparatus of the character indicated, comprising a chamber for receiving the material to be treated and the liquid employed in treating the material, which receptacle has an oil-outlet at its upper extremity; a hollow core arranged centrally of the material-receiving chamber of the receptacle, and extending from the chamber's upper end into the lower portion of the chamber and closed at its lower end; a pipe extending from outside of the receptacle downwardly through the said core and arranged to discharge in the lower portion of the aforesaid chamber; a tank or reservoir in open relation with the said pipe, a valve in the line of the said pipe between the tank or reservoir and the pipe's discharging end, and an air-pump connected with the said tank or reservoir, substantially as and for the purpose set forth.

12. Apparatus of the character indicated, comprising a receptacle for receiving the material to be treated and the liquid employed in treating the material, which receptacle has an oil-outlet at its upper end, and is provided with a valved residue-outlet at its lower end; means for heating the material introduced into the receptacle; means for draining the receptacle of solution that is formed therein and convertible into gelatin; a valved pipe extending downwardly into the lower portion of the material-receiving chamber of the receptacle, and having its discharging end provided with a plurality of laterally-projecting arms; the check-valves within the said arms, and means for supplying air under pressure to the said pipe, substantially as and for the purpose set forth.

13. In apparatus of the character indicated, the combination, with a receptacle for receiving the material to be treated and the liquid employed in treating the material, which receptacle has an oil-outlet at its upper extremity to permit the oil extracted from the material within the receptacle to overflow at the oil-outlet, of a water-receiving chamber arranged to receive the oil overflowing from the said oil-outlet, and means for boiling the water within the said chamber, substantially as and for the purpose set forth.

14. In apparatus of the character indicated, the combination with a receptacle for receiving the material to be treated and the liquid employed in treating the material, which receptacle has an oil-outlet at its upper end to permit the oil extracted from the material within the receptacle to overflow at the oil-outlet: of a water-receiving chamber; means for boiling the water within the said chamber; means for conducting oil from the aforesaid oil-outlet into the said chamber, and a trough or receptacle connected with and arranged to receive the oil from the upper and oil-discharging end of the water-receiving chamber, substantially as and for the purpose set forth.

15. In apparatus of the character indicated, the combination with a receptacle for receiving the material to be treated and the liquid employed in treating the material, which receptacle has an oil-outlet at its upper end to permit the oil extracted from the material within the receptacle to overflow at the oil-outlet: of a water-receiving chamber; means for boiling the water within the said chamber; means for conducting oil from the aforesaid oil-outlet to the said chamber; a trough or receptacle connected with and arranged to receive the oil from the upper and oil-discharging end of the water-receiving chamber, and two valved drain-pipes connected with the last-mentioned trough or receptacle, substantially as and for the purpose set forth.

16. In apparatus of the character indicated, the combination with a receptacle for receiving the material to be treated and the liquid employed in treating the material, which receptacle is provided with an oil-overflow at its upper end: of a water-receiving chamber surrounding and exposed to the said receptacle; means for boiling the water introduced into the said chamber and thereby generating the steam required to purify the oil received upon the water within the said chamber for an overflow of oil from the oil-outlet of the aforesaid receptacle, substantially as and for the purpose set forth.

17. In apparatus of the character indicated, the combination with a receptacle for receiving the material to be treated and the liquid employed in treating the material, which receptacle has its upper end open and adapted to discharge oil extracted and rising from the material within the receptacle: of a water-receiving chamber surrounding and exposed to the said receptacle below the latter's oil-discharging end; means for boiling the water within the said chamber, and a trough or receptacle formed at the upper end of the said chamber and arranged as required to receive oil overflowing from the top of the body of boiling water within the chamber, substantially as and for the purpose set forth, 18. In apparatus of the character indicated, the combination with a receptacle for receiving the material to be treated and the liquid employed in treating the material, which receptacle has its upper end open and adapted to discharge the oil extracted and rising from the material within the receptacle: of a water-receiving chamber surrounding and exposed to the said receptacle below the latter's oil-discharging end; means for boiling the water within the said chamber; a trough or receptacle formed at the upper end of the said chamber and arranged as required to receive oil overflowing from the top of the body of water within the chamber, which trough has its bottom deeper at one side of the water-receiving chamber, and two valved pipes connected with the deeper portion of the trough, substantially as and for the purpose set forth.

19. Apparatus of the character indicated, comprising a water-receiving tank, a receptacle arranged within and centrally of the said tank and adapted to receive material to be treated and the liquid employed in treating the material, which receptacle has its upper end provided with an oil-overflow arranged to discharge into the aforesaid tank, a heating-coil within the lower portion of the water-receiving tank, a valved water-supply pipe arranged to discharge into the inner receptacle, and a valved water-supply pipe arranged to discharge into the water-receiving chamber of the aforesaid tank, substantially as and for the purpose set forth.

20. Apparatus of the character indicated, comprising an inner receptacle $a$ provided with an oil-overflow at its upper end, a water-receiving tank surrounding the said receptacle and having a bottom declining toward the said receptacle, a heating-coil within the chamber of the water-receiving tank, a water-supply pipe discharging into the upper portion of the chamber of the tank, and a valved drain-pipe in open relation with the said chamber and leading from the lower portion of the aforesaid declining bottom of the tank, substantially as and for the purpose set forth.

Signed by me at Cleveland, Ohio, this 30th day of October, 1899.

EUGENE R. EDSON.

Witnesses:
C. H. DORER,
A. H. PARRATT.